3,019,176
FUEL ELEMENT
Andrew Wetherbee McReynolds, La Jolla, and Lieuwe J. Dijkstra, San Diego, Calif., assignors to General Dynamics Corporation, New York, N.Y., a corporation of Delaware
No Drawing. Filed Nov. 21, 1957, Ser. No. 697,802
11 Claims. (Cl. 204—193.2)

The present invention generally relates to fuel elements for a neutronic reactor and more particularly relates to solid homogeneous fuel elements for a neutronic reactor and a method of fabricating the same.

Since the present invention is not primarily concerned with the theory and practice of the design, construction and operation of neutronic reactors but of only the fuel elements therefor, a detailed description of neutronic reactors will not be made herein. Various literature sources, such as the book entitled "The Elements of Nuclear Theory," by Glasstone and Edlund, published, 1952, by Van Nostrand Company, Inc., and numerous patents, including Patent No. 2,708,656, to Fermi et al., May 17, 1955, are available which contain such information on neutronic reactors. Moreover, the type of neutronic reactor for which the fuel element of the present invention is particularly adapted is set forth in United States application Serial No. 664,706, to Taylor, McReynolds and Dyson, filed June 10, 1957, the assignee of which application is also the assignee of the present application.

Neutronic reactors may be classified in a number of ways. One such classification is according to the condition of the fuel for the reactor. In this connection, the reactor may be classified as a heterogeneous reactor or as a homogeneous reactor. In a heterogeneous reactor, bodies of fissionable material or fuel are distributed or arranged in a pattern throughout suitable moderating material. The fuel is generally in the form of discrete lumps which are surrounded by moderating material. In a homogeneous reactor the fissionable material and the moderating material are combined in a mixture, such that an effective homogeneous medium is presented to the neutrons. Such a mixture may be either a solution of fuel and moderating material or a solid mixture of particles of the fuel and of the moderating material.

The neutronic reactor disclosed in application Serial No. 664,706 is of the solid homogeneous type. The core for the reactor is disclosed as comprising a plurality of spaced fuel elements. Each of the fuel elements includes a homogeneous mixture of a solid moderating material, preferably zirconium or other metal hydride, and a fissionable material disposed within an elongated, closed container formed of a material resistant to corrosion and having a low thermal neutron capture cross section.

In addition to the moderator and fissionable material, the fuel element disclosed in application Serial No. 664,-706 may also contain a poison, that is, a material having a high thermal neutron capture cross section. Poisons may be added to compensate for build-up of materials emitted during the fission process and also to compensate for fuel burn-up so as to considerably extend the effective life of the fuel element. Poisons may also be added which provide a desired negative temperature coefficient to the reactor system, as more fully described in application Serial No. 664,706.

It is highly desirable that a fuel element for a neutronic reactor of the type disclosed in application Serial No. 664,706 be easily fabricated from readily available materials. It is desirable that the fuel element have high thermal conductivity and a high degree of structural strength and shock resistance and that it incorporate components which are radiation resistant so that the fuel element will be durable in use. In order to provide ease of fabrication, the fuel element must be capable of being readily dimensioned to fairly critical tolerances without expensive machining operations. In addition, the method of fabrication should be flexible enough so that additional materials, such as poisons, can be easily added during manufacture of the fuel element.

The described requisites and desired characteristics for a fuel element for a neutronic reactor, particularly the reactor disclosed in application Serial No. 664,706, are incorporated in the fuel element of the present invention. The fuel element of the present invention can be easily fabricated, in accordance with the present invention, from readily available materials in a simple but effective manner. Moreover, the fuel element has inherent safety, since the moderator and fissionable material are effectively protected from exposure to the surrounding environment in the event of a rupture of the fuel element.

Accordingly, the primary object of the present invention is to provide a novel fuel element for a neutronic reactor such as is disclosed in application Serial No. 664,706, and a method of fabricating the same. It is also an object of the present invention to provide a compact, solid homogeneous type fuel element for such a neutronic reactor, which fuel element has high thermal conductivity, structural strength, shock resistance and radiation damage resistance, as well as inherent safety. It is a further object of the present invention to provide a simple method of fabricating a novel, solid homogeneous type fuel element for a neutronic reactor from readily available materials.

Further objects and advantages of the present invention will be apparent from a study of the following detailed description.

The fuel element of the present invention comprises a mixture of particulate fissionable material and a suitable solid metal hydride moderating material in particulate form substantially uniformly dispersed throughout a solid supporting matrix comprising radiation-resistant metal having high ductility and thermal conductivity, as well as low thermal neutron absorption cross section. The matrix is encased within a container which also has low thermal neutron absorption cross section and high thermal conductivity. The matrix and moderator are bonded to each other. In addition, the matrix is effectively bonded to the container so that a compact, structurally stable, unitary product is obtained. At least some of the metal hydride moderating material may also be bonded to the container.

The fuel element of the present invention is fabricated by uniformly dispersing the particulate metal hydride moderating material and particulate fissionable material within the supporting matrix, encasing the resulting mixture within the container and densifying the mixture in a manner to effect the described bonding of the fuel element components.

Now considering the fuel element of the present invention more particularly, the first component of the fuel element is fissionable material in particulate form. In this connection, suitable isotopes of uranium, thorium and plutonium, and oxides and mixtures thereof can be utilized as fissionable material in the fuel element. However, it is preferred to utilize as the fissionable material enriched uranium oxide powder, that is, uranium oxide powder comprising a mixture of the oxide of uranium 238 together with the oxide of uranium 235, the proportion of the components of the mixture depending upon the particular requirements for the neutronic reactor. Regardless of what fissionable material is selected, such material should be preesnt in particulate form and have an average particle size of between about 1 and about 50 microns. In this connection, the fissionable material can be subjected to any suitable comminuting procedure, such as conventional grinding or the like, to reduce the particle size to within the specified range.

The fissionable material is utilized in the fuel element of the present invention in a concentration of between about 1 and about 10 percent, by weight of the constituents of the fuel element other than the outer casing or container. The particular concentration of the fissionable material selected will, of course, necessarily depend upon the characteristics of the fissionable material and upon the particular requirements of the neutronic reactor.

The second component of the fuel element of the present invention comprises suitable particulate metal hydride moderating material. The metal hydride moderating material should have a thermal neutron absorption cross-section less than 1.5 barns. In addition the metal hydride moderating material should be stable at the operating temperature of the reactor in which it is to be used (generally above 300° C.). Zirconium, yttrium and magnesium hydrides, for example, may be used as the particulate moderating material in forming a fuel element in accordance with this invention. Zirconium hydride is an especially good moderator, particularly when the hydrogen-to-zirconium ratio is relatively high. For purposes of illustration, the description of the fuel element will be limited to one which is formed with zirconium hydride as the moderating material. It should be understood that other suitable metal hydrides could be substituted therefor.

Zirconium hydride can be prepared, in accordance with well known techniques, so that the hydrogen-to-zirconium ratio is as high as 2.0:1. Zirconium can be hydrided when in the form of a solid slab, powder, or when in sponge form. Such hydriding is conventionally carried out by heating the zirconium to a relatively high temperature, up to about 900° C., in a controlled hydrogen atmosphere and maintaining the zirconium at such temperature for a time sufficient to attain the desired hydrogen-to-zirconium ratio. If the initially attained hydrogen-to-zirconium ratio is higher than that which can exist at the temperature of the reactor in which the zirconium hydride is to be used, the zirconium hydride may be stabilized against hydrogen loss by heating it to a temperature slightly higher than the temperature to which it will be subjected during subsequent use in the reactor.

After the zirconium hydride, which is obtained by the described hydriding procedure, is comminuted to a particle size within the range of between about 5 and about 1,000 microns, it is ready for use in the fuel element of the present invention. The comminuting of the zirconium hydride should generally be carried out at a temperature below about 200° C. or in an oxygen-free atmosphere, since zirconium hydride is pyrophoric at temperatures above about 200° C. The comminuting may be, for example, successfully carried out by crushing the zirconium hydride to the desired particle size with conventional crushing equipment at ambient temperature.

Zirconium hydride of the desired particle size is utilized in the fuel element of the present invention in an amount sufficient to provide the desired moderating effect. In general, the zirconium hydride will comprise between about 60 to about 90 percent of the total weight of the fuel element exclusive of the container. The particular concentration of zirconium hydride selected will depend on its hydrogen-to-zirconium ratio and upon the requirements of the particular neutronic reactor.

It has been found that the desired uniform dispersion of particulate zirconium hydride within the metal matrix in the fuel element of the present invention, as more fully described hereinafter, is more readily obtained without substantial agglomeration of zirconium hydride particles when zirconium hydride of average particle size of at least about 25 microns is utilized. Accordingly, it is preferred to utilize in the fuel element zirconium hydride having an average particle size between about 25 microns and about 1,000 microns.

The third component of the fuel element of the present invention comprises metal which forms the solid supporting matrix in the fuel element. The matrix may be a metal element or metal alloy which has a relatively low thermal neutron absorption cross-section of not more than about 0.2 barn. The matrix should be radiation damage-resistant. Furthermore, the matrix should have high thermal conductivity and be relatively soft, that is, have high ductility and malleability. In addition, the matrix material should provide the fuel element with the desired shock resistance and, if necessary, additional structural strength so as to render it durable in use.

It has been found that metals which are suitable for use as the matrix include aluminum, magnesium, bismuth, lead, and mixtures thereof. Aluminum and magnesium are particularly suitable metals for use as the matrix material, inasmuch as their thermal conductivity is higher than that of bismuth and lead, as are their melting points and structural strength. Aluminum alloy containing between about 10 and about 30 percent by weight of magnesium has also been found to be suitable as the matrix material.

The matrix material is utilized in an amount of between about 10 and about 30 percent, by weight of the fuel element exclusive of the container, depending upon the matrix material selected and the particular characteristics desired in the fuel element. The matrix material, zirconium hydride and fissionable material are hereinafter referred to as the mixture, since these components are intimately associated in the fuel element.

One or more poisons may, if desired, also be added to the mixture in fabricating the fuel element of the present invention. Such poisons, when present, are generally utilized in a total amount of less than about 1 percent by weight of the mixture. Examples of suitable poisons are samarium, cadmium, boron, erbium, etc.

Poisons may be added to the mixture for one or more of the reasons previously specified. The poisons may be added to the mixture in particulate form of any desired size, preferably relatively small size so as to be more readily uniformly dispersed within the mixture in the fuel element.

If desired, other materials may be incorporated in the mixture for their own properties, as long as they are compatible with the remaining components of the mixture.

The fuel element of the present invention also includes a sealed, gas tight container in which the described mixture of components is disposed. The container is formed of a single metal or a metal alloy which is radiation damage-resistant and corrosion-resistant and which has high thermal conductivity and structural strength. The metal for the container should also have a low thermal neutron absorption cross section, preferably not more than about 0.2 barn, and be compatible with the matrix material of the described mixture. For the purposes of the present invention, the metal of the container may, for example, be aluminum, stainless steel, zirconium, etc., depending upon the particular matrix metal utilized in the fuel elemnt. The container provides the fuel elemnt with increased structural strength.

The container may be of any suitable size and shape, depending to some extent upon the components of the fuel element and upon the fuel requirements and design of the particular neutronic reactor in which it is to be used. The container is preferably relatively thin, as, for example, an aluminum container having a wall thickness of about 0.03 inch. For example, in the reactor disclosed in application Serial No. 664,706, the container may be of a length of about 10 to about 14 inches and of circular or hexagonal transverse cross section, with an average diameter of between about 1.0 and 2.0 inches. Since the container is closed and gas-tight, it effectively retains fission products within the fuel element.

In the finished fuel element the particulate zirconium hydride and matrix material are firmly bonded to each other. The matrix material is also bonded to the container and, in most instances, so also is at least a portion of the zirconium hydride. Although particulate zirconium hydride has relatively low thermal conductivity, the intimate association thereof with the matrix and container, both of which have high thermal conductivity, assures efficient heat transfer from the zirconium hydride to the cooling medium or other environment, external of the fuel element, which heat transfer is important in the proper functioning of the neutronic reactor incorporating such fuel elements.

As the first step in the method of the present invention for fabricating the fuel element, the particulate zirconium hydride and particulate fissionable material, together with any additional components, such as poisons, are mixed with and uniformly dispersed within the supporting matrix material. This can be accomplished in any one of a number of ways, utilizing conventional treating equipment.

It is preferred to combine the particulate zirconium hydride, particulate fissionable material and matrix metal when the latter is also in a particulate form, for example, of a particle size within the range of between about 10 and about 200 microns. In such event, the matrix metal, zirconium hydride and fissionable material, together with any particulate poisons and other addends which it may be desired to incorporate into the fuel element, may be homogeneously mixed, as in a ball mill or other suitable mixing apparatus under liquid xylene. After the mixing operation, the xylene is then evaporated.

A second technique for carrying out the mixing and dispersing step comprises adding particulate zirconium hydride and particulate fissionable material, both of the described particle size, separately or together to a bath of molten matrix metal and mixing the components therein, as by stirring, etc. The mixture can then be subjected, while the matrix metal is still in molten form, to suitable compression which packs the zirconium hydride and fissionable material and squeezes out the matrix metal, until the specified concentration of components is obtained. The compression may be carried out in a die or mold or in the container for the fuel element, if the melting point of the container is above that of the molten matrix material. The container during such compression is open at one end. This method is particularly adapted to such low melting point matrix materials as lead and bismuth, which have melting points of about 312° C., and about 270° C., respectively.

A third technique for carrying out the mixing and dispersing step comprises homogeneously mixing the zirconium hydride and fissionable material together, as in a ball mill under xylene, and continuing the milling operation until the xylene is completely evaporated. The mixture is then compressed in a die at a pressure of, for example, about 20,000 to 25,000 pounds per square inch, until a porous cake is formed. Molten matrix metal can then be brought into contact with the porous cake in an oxygen-free atmosphere so as to infiltrate the cake by capillary action and to a desired amount within the specified concentration range.

As the second step in the method of the present invention, the mixture of zirconium hydride, fissionable material and matrix metal is densified by hot extrusion or by pressing and encased in the metal container. At least a portion of the densification can be carried out in a mold or die. However, final densification and bonding of the components of the mixture and the container is accomplished while the mixture is within the container and the container is within a die. The container is open at at least one end thereof to expose the mixture for densification. The densification is carried out until the fuel element has a density at least about 80 percent that of the theoretical density of the mixture, and the particulate zirconium hydride and particulate fissionable material are uniformly dispersed in matrix metal, with the zirconium hydride, as previously described, being bonded to the matrix metal and the matrix metal being bonded to the metal container. At least a portion of the zirconium hydride may be bonded to the container, as previously indicated.

A number of techniques are effective for carrying out the second step of the method of the present invention. In this connection, the described mixture from the first step of the method of the present invention can be placed in a mold or directly into the metal container and subjected to suitable densifying procedures. Whatever the technique, the densification essentially comprises one or more pressing operations. Generally, the pressing operations comprise hot extrusion or cold pressing followed by hot pressing and sintering. However, hot pressing and sintering can be employed, if desired, without first cold pressing the mixture.

Cold pressing is carried out at a suitable pressure and ambient temperature to increase the density of the mixture to at least about 65 percent of the theoretical density. The cold pressing operation may be carried out with conventional equipment at a suitable pressure of up to about 40,000 pounds per square inch. When the mixture is entirely in particulate form, that is, when and if it is desired to cold press such mixture in the metal container, the cold pressing is preferably carried out in stages, particularly where the length of the container is substantially greater than its diameter. Before cold pressing, the container is preferably placed in a shape-retaining die.

Thereafter, the container is only partially filled with the particulate mixture, as for example, one-third full, and cold pressing is carried out as previously described. Subsequently, more particulate mixture is added and cold pressing is again carried out. This procedure is conducted until the whole metal container has been fully packed with the mixture and all the mixture therein has been cold pressed. Hot pressing and sintering are generally carried out, in the manner hereinafter described, after each cold pressing stage. However, in certain cases such hot pressing and sintering can be carried out in a single stage subsequent to the final cold pressing stage.

In addition to cold pressing, hot pressing and sintering of the mixture are employed to increase its density to at least 80 percent, preferably about 95 percent, of theoretical density. The hot pressing and sintering can be conducted in one or more stages with conventional hot pressing and sintering equipment while the mixture is in the open ended container. If cold pressing is carried out in a mold instead of the metal container, the mixture is first transferred to the metal container before the hot pressing and sintering stage. The metal container is placed in a suitable die before the hot pressing operation to prevent the container from becoming deformed during the hot pressing and sintering operation.

Hot pressing and sintering are conducted at elevated pressure, for example, at pressures between about 10,000 and about 25,000 pounds per square inch, and at temperatures between about 500° C. and about 800° C., but below the melting point of the container, and in the presence of hydrogen or an inert atmosphere, such as argon, so as to prevent substantial reduction of the hydrogen-to-zirconium ratio in the zirconium hydride and also to prevent chemical reactions between the mixture and the atmosphere. Such hot pressing and sintering can usually be accomplished by maintaining the mixture at the specified temperature and pressure for a period of about one hour to provide the desired densification of the mixture.

The hot pressing and sintering can be carried out, as previously indicated, without cold pressing. One such instance is where the previously described second technique is employed for step one of the method of the present invention. That is, where the mixture is formed by introducing particulate zirconium hydride and particulate fissionable material into molten matrix material and the molten material is subjected to compression, as in a die, to squeeze excess molten material therefrom. In this case the hot mixture can be introduced into the container when below the melting point of the container and can be directly subjected to hot pressing and sintering within the container.

During the hot pressing operation, the described bonding of zirconium hydride to the matrix and bonding of the matrix to the container take place. Usually, there is also some bonding of zirconium hydrid eto the container. In addition, if the matrix metal is in powder form, the particles thereof bond into a supporting mass.

Subsequent to the hot pressing and sintering, the formed fuel element is allowed to gradually cool in the presence of hydrogen or inert gas to below a temperature of about 200° C. and is thereafter cooled to ambient temperature in the presence of or absence of hydrogen or an inert gas. If the fuel element is cooled to ambient temperature in the presence of hydrogen, it can be sealed in a gas-tight manner while maintaining the hydrogen atmosphere. The sealed fuel element should generally contain hydrogen at about atmospheric pressure and be substantially completely free of other gases. However, if the fuel element is not cooled to ambient temperature in a hydrogen atmosphere, it must be flushed with hydrogen to remove other gases before it is sealed. The flushing operation can be carried out in accordance wtih conventional gas flushing techniques. When the gaseous content of the mixture in the fuel element is substantially completely hydrogen at atmospheric pressure, the fuel element is then sealed in a gas-tight manner. The sealing can be carried out in the usual manner, as by welding or the like, to securely affix a cover over the open end of the fuel element. The sealed fuel element contains hydrogen at about atmospheric pressure. The sealing operation is carried out in a manner such that the closed container is gas tight at all normal operating temperatures for the reactor. The cover for the fuel element may be of any suitable size and shape commensurate with the design of the main body of the container and, when in place, forms a part of the container of the fuel element. The cover is constructed of the same metal or alloy as the remainder of the container or of another metal or alloy compatible therewith and suitable for use in fabricating the container. The sealed container acts to contain fission gases and other fission products in the fuel element during its use.

If desired, one or more poisons may be added to the fuel element in the form of one or more discrete discs, lumps, pellets or the like, within the container. The amount and position of such poisons within the fuel element will depend on the specific design of the fuel element as well as the reactor in which it will be used.

Accordingly, a completed solid, homogeneous fuel element is obtained which is ready for use in a suitable solid homogeneous type neutronic reactor, such as that disclosed in application, Serial No. 664,706.

The following examples further illustrate certain features of the present invention:

*Example I*

Sponge zirconium metal is hydrided in a hydrogen atmosphere at a temperature of about 600° C. and a pressure of about one atmosphere over a period of about one hour to provide a zirconium hydride having a hydrogen-to-zirconium ratio of about 1.85:1. This ratio is the maxium ratio which is stable at an operating temperature of about 575° C. and below, and a hydrogen pressure of about one atmosphere. 575° C. is the maximum operating temperature range for the reactor into which the fuel element formed with the zirconium hydride is to be incorporated. After slowly cooling to ambient temperature in a hydrogen atmosphere, the zirconium hydride is then crushed while immersed in liquid xylene in a ball mill to a particle size in the range of about 50 to 100 microns and is thereafter homogeneously mixed in a ball mill under liquid xylene with enriched uranium oxide powder having an average particle size of about 20 microns and with aluminum matrix-forming powder having an average particle size of about 40 microns. The uranium of the uranium oxide is enriched with an amount of uranium 235 commensurate with the requirements of the particular neutronic reactor. In the powder mixture, the uranium oxide is present in an amount of about 1.5 percent, by weight of the final mixture, the zirconium hydride is present in an amount of about 88.5 percent, by weight of the final mixture, and the aluminum is present in an amount of about 10 percent, by weight of the final mixture.

An aluminum container, open at one end and having a 0.030 inch wall thickness, a 12 inch length, a generally hexagonal transverse cross section and 1.5 inch diameter, is placed in a close fitting die with the open end of the container exposed and is packed about one-third full with the powder mixture. The powder mixture is then cold pressed at about 40,000 pounds per square inch and ambient temperature to densify the same to about 80 percent of theoretical density.

The packed powder mixture is then subjected to hot pressing and sintering in the container at about 25,000 pounds per square inch and at a temperature of about 550° C. in a hydrogen atmosphere at atmospheric pressure to increase the density of the mixture to about 95 percent of theoretical density, while maintaining the hydrogen-to-zirconium ratio in the zirconium hydride at about 1.85:1.

The container and mixture are allowed to cool to ambient temperature in the hydrogen atmosphere, and additional powder mixture is then packed into the container until it is about two-thirds full. Cold pressing and hot pressing and sintering are then repeated in the described manner, in the presence of a hydrogen atmosphere, to increase the density of the added powder mixture to about 95 percent of theoretical density. The container and mixture are then allowed to cool in the described manner. Additional powder mixture is then added to the container and the cold pressing and hot pressing and sintering are again carried out until the density of the newly added powder mixture is increased to about 95 percent of theoretical density. Additional charges of powder mixture are added to the container and densification after the addition of each charge is carried out until the desired height of the densified mixture is obtained within the container.

The densifying steps result in a unitary fuel element having a solid aluminum matrix with particulate zirconium hydride and particulate uranium oxide uniformly dispersed therein. In this fuel element the zirconium hydride and the aluminum container are firmly bonded to the aluminum matrix so that effective heat transfer from the zirconium hydride through the container wall is assured. Some particles of zirconium hydride are also bonded to the container.

After the final hot pressing operation, the fuel element is gradually cooled to ambient temperature in a hydrogen atmosphere, and the mixture is then sealed in the container by welding a cover over the open end of the container, the hydrogen in the container being at about atmosphere pressure. The sealing is carried out so as to render the container gas tight. The finished compact fuel element has high structural strength and shock resistance, inherent safety and other desired properties, including high thermal conductivity and radiation damage-resistance.

A number of the described fuel elements can be assembled to form the core of a neutronic reactor. In a representative neutronic reactor of the type disclosed in application Serial No. 664,706, 37 of the fuel elements of the described size may, for example, be grouped into a generally cylindrical fuel core bundle, with approximately 0.1 inch spaces between individual fuel elements. A reflector consisting of an 18 inch thick graphite layer can be disposed on all sides of the fuel core bundle. Cooling can be provided by the circulation of natural water between core fuel elements.

*Example II*

Particulate zirconium hydride having a hydrogen-to-zirconium ratio of about 1.85:1 and having a particle size in the range of about 50 to 100 microns is mixed in an amount of about 68.3 percent, by weight of the final mixture, with about 1.7 percent, by weight of the final mixture, of enriched uranium oxide having an average particle size of about 10 microns, about 30 percent, by weight of the final mixture, of lead and about 10 parts/million, by weight of the final mixture, of samarium added as samarium oxide having an average particle size of about one micron, the degree of enrichment of the uranium oxide being sufficient for the particular reactor requirements.

The mixing is carried out by adding the particulate uranium oxide, particulate zirconium hydride and particulate samarium oxide in the specified concentration to a bath containing the molten lead in the specified concentration. The bath is in a hydrogen atmosphere and is agitated until the dispersion of the solid particles in the molten lead is substantially uniform.

The mixture is then placed in an open end, cylindrical, stainless steel container positioned within a suitable closely fitting open ended die, the container being about 12 inches in length, one inch in diameter and about 1/32 inch wall thickness. When the container is completely filled, the mixture therein is subjected to hot pressing and sintering at about 500° C. and about 25,000 pounds per square inch pressure in a hydrogen atmosphere until the density of the mixture has increased to about 95 percent of theoretical density and effective bonding of the container and zirconium hydride to the matrix of lead has taken place. The fuel element is thereupon gradually cooled to ambient temperature in the hydrogen atmosphere. Since the volume of the mixture decreases during densification, additional charges of the mixture may be added and densified within the container until the desired height of the densified mixture is obtained within the container. The cooled mixture is then flushed with hydrogen gas at atmospheric pressure to assure substantially complete removal of all gases other than hydrogen from the mixture and interior of the container. The container is then sealed in the manner set forth in Example I.

A compact, finished fuel element is obtained which contains particulate zirconium hydride and particulate uranium oxide uniformly dispersed throughout a solid supporting matrix of lead encased in a gas-tight stainless steel container. The fuel element has high structural strength and thermal conductivity, durability and inherent safety. The fuel element can be directly incorporated into the core of a neutronic reactor.

The above examples demonstrate that the fuel element of the present invention can be formed in accordance with the method of the present invention, utilizing a selection of materials for the basic components and various techniques for the processing steps. The method of the present invention provides a simple and efficient manner of fabricating a solid homogeneous fuel element for a neutronic reactor, which fuel element has improved stability, strength and durability. Various other advantages of the fuel element of the present invention and of the method of fabricating the same are set forth in the foregoing.

Such modifications in the construction and design of the fuel element of the present invention and in the method of fabricating the same as are within the skill of those versed in the art are contemplated as being within the scope of the present invention.

We claim:

1. A fuel element for a neutronic reactor comprising a mixture consisting essentially of a fissionable material in particulate form, substantially all of the fissionable material of said fuel element being in said mixture, a solid moderating material in particulate form substantially comprising a metal hydride having a low thermal neutron cross section and high temperature stability, and a solid supporting matrix substantially comprising radiation damage-resistant metal having a low thermal neutron absorption cross-section and high ductility and thermal conductivity, said particulate metal hydride and said particulate fissionable material being substantially uniformly dispersed within said matrix, and a closed, corrosion-resistant container formed of metal having low thermal neutron absorption cross-section and high thermal conductivity and structural strength encasing said matrix, said particulate metal hydride, said particulate fissionable material and said metal being chemically substantially non-reactive with said matrix metal, said matrix being bonded to said particulate metal hydride and to said container, whereby a fuel element of high structural strength and inherent safety is provided.

2. A fuel element for a neutronic reactor comprising a mixture of fissionable material having an average particle size between about 1 and about 50 microns, zirconium hydride having an average particle size between about 5 and about 1000 microns and a solid supporting matrix substantially comprising radiation damage-resistant and corrosion-resistant metal having low thermal neutron absorption cross-section and high ductility and thermal conductivity, said particulate zirconium hydride and said particulate fissionable material being uniformly dispersed within said matrix, and a container encasing said matrix, particulate zirconium hydride and particulate fissionable material, said container being formed of corrosion-resistant, high structural strength metal chemically substantially non-reactive with said matrix metal, said container metal having low thermal neutron absorption cross-section and high thermal conductivity, said container and said particulate zirconium hydride being bonded to said matrix, whereby a fuel element of high structural strength and inherent safety is provided.

3. A fuel element for a neutronic reactor comprising a mixture of fissionable material having an average particle size between about 1 and about 50 microns and in an amount between about 1 and about 10 percent, by weight of said mixture, particulate zirconium hydride having an average particle size between about 5 and about 1000 microns and in an amount of between about 60 percent and about 90 percent, by weight of said mixture, and a solid supporting matrix in an amount of at least about 10 percent and not more than about 30 percent, by weight of said mixture, said matrix substantially comprising radiation damage-resistant and corrosion-resistant metal having low thermal neutron absorption cross-section and high ductility and thermal conductivity, said particulate zirconium hydride and said particulate fissionable material being substantially uniformly dispersed within said matrix, and a container tightly encasing said mixture, said container being formed of corrosion-resistant, high structural strength metal chemically substantially non-reactive with said matrix metal, said container metal having low thermal neutron absorption cross-section and high thermal conductivity, said container and said particulate zirconium hydride being bonded to said matrix, whereby a fuel element of high structural strength and inherent safety is provided.

4. A fuel element for a neutronic reactor comprising a mixture of an enriched, uranium-containing, fissionable material having an average particle size between about 1 and about 50 microns and in an amount between about 1 and about 10 percent, by weight of said mixture, zirconium hydride having an average particle size between about 5 and about 1000 microns and in an amount of between about 60 percent and about 90 percent, by weight of said mixture, and a solid, supporting matrix in an amount of at least about 10 percent and not more than about 30 percent, by weight of said mixture, said matrix substantially comprising metal selected from the group consisting of aluminum, lead, bismuth and alloys of any two or more of said metals, said particulate zirconium hydride and said particulate fissionable material being uniformly dispersed within said matrix, and a container tightly encasing said mixture, said container being formed of corrosion-resistant, high structural strength metal chemically substantially non-reactive with said matrix metal, said container metal having low thermal neutron absorption cross-section and high thermal conductivity, said container and said particulate zirconium hydride being bonded to said matrix, whereby a fuel element of high structural strength and inherent safety is provided.

5. A fuel element comprising a mixture of oxide of uranium, said uranium consisting of $U^{238}$ and $U^{235}$, said oxide having an average particle size between about 1 and about 50 microns and being present in an amount of between about 1 percent and about 10 percent, by weight of said mixture, zirconium hydride having a hyrogen-to-zirconium ratio of between about 1.8:1 and about 2:1 and an average particle size between about 5 and about 1000 microns, said zirconium hydride being present in an amount of between about 60 percent and about 90 percent, by weight of said mixture, particulate burnable poison for controlling the fission process of the fuel element, said poison comprising material selected from the group consisting of cadmium, samarium, erbium, boron and alloys of any two or more of said materials, present in an effective amount of up to about 1 percent, by weight of said mixture, and a solid supporting aluminum matrix, in an amount of at least about 10 percent and not more than about 30 percent, by weight of said mixture, said particulate zirconium hydride, said particulate uranium oxide and said particulate poison being uniformly dispersed within said matrix, and an aluminum container tightly encasing said mixture, said particulate zirconium hydride and said aluminum container being bonded to said matrix, whereby a fuel element of high structural strength and inherent safety is provided.

6. The method of fabricating a fuel element for a neutronic reactor, which comprises the steps of forming a mixture by uniformly dispersing particulate metal hydride having an average particle size between about 5 and about 1000 microns in an amount between about 60 percent and about 90 percent, by weight of said mixture, and particulate fissionable material having an average particle size between about 1 and about 50 microns in an amount between about 1 percent and about 10 percent within a supporting matrix substantially comprising radiation damage-resistant and corrosion-resistant aluminum having a low thermal neutron absorption cross-section and high ductility and thermal conductivity, said matrix being present in an amount of between about 10 percent and about 30 percent of said mixture, said metal hydride having a thermal neutron absorption cross section less than 1.5 barns and being stable at the operating temperature of the reactor in which it is to be used that is, above 300° C., encasing said mixture in a container formed of corrosion-resistant, high structural strength metal chemically substantially non-reactive with said matrix metal, said container metal having low thermal neutron absorption cross-section and high thermal conductivity, densifying said mixture within said container to provide a solid fuel element having a density of at least about 80 percent of theoretical density and high structural strength and inherent safety, wherein said fissionable material and said metal hydride are maintained in particle form and said particulate metal hydride and said container are bonded to said matrix, providing a hydrogen atmosphere in said container and sealing said container so as to render the same gas tight.

7. The method of fabricating a fuel element for a neutronic reactor, which comprises the steps of forming a mixture by uniformly dispersing zirconium hydride having an average particle size between about 5 and about 1000 microns in an amount between about 60 percent and about 90 percent, by weight of said mixture, and fissionable material having an average particle size between about 1 and about 50 microns in an amount between about 1 percent and about 10 percent, by weight of said mixture, within a supporting matrix of aluminum in an amount of from about 10 to about 30 percent, by weight of said mixture, encasing the resulting mixture in a container formed of corrosion-resistant, high structural strength metal chemically substantially non-reactive with said matrix metal, said container metal having low thermal neutron absorption cross-section and high thermal conductivity, densifying said mixture within said container to provide a solid fuel element having a density of at least about 80 percent of theoretical density and high structural strength and inherent safety, wherein said fissionable material and said zirconium hydride are maintained in particle form, and said container and said particulate zirconium hydride are bonded to said matrix, providing a hydrogen atmosphere in said container and sealing said container so as to render the same gas-tight.

8. The method of fabricating a fuel element for a neutronic reactor, which comprises the steps of forming a mixture by uniformly dispersing zirconium hydride having an average particle size between about 5 and about 1000 microns in an amount between about 60 percent and about 90 percent, by weight of said mixture, and fissionable material having an average particle size between about 1 and about 50 microns in an amount between about 1 percent and about 10 percent, by weight of said mixture, within a supporting matrix in an amount between about 10 percent and about 30 percent, by weight of said mixture, said matrix substantially comprising radiation damage-resistant and corrosion-resistant metal having low thermal neutron absorption cross-section and high ductility and thermal conductivity, encasing said mixture in a container formed of corrosion-resistant, high structural strength metal chemically substantially non-reactive with said matrix metal, said container metal having low thermal neutron absorption cross-section and high thermal conductivity, densifying said mixture within said container to provide a solid fuel element having a density of at least about 80 percent of theoretical density and high structural strength and inherent safety, wherein said fissionable material and said zirconium hydride are maintained in particle form, and said container and said particulate zirconium hydride are bonded to said matrix, providing a hydrogen atmosphere in said container and sealing said hydrogen at about atmospheric pressure in said container.

9. The method of fabricating a fuel element for a neutronic reactor, which comprises the steps of forming a mixture by uniformly dispersing zirconium hydride having a hydrogen to zirconium ratio of between about 1.8:1 and about 2:1 and an average particle size between about 25 and about 1000 microns in an amount of between about 60 percent and about 90 percent, by weight of said mixture, and oxide of uranium, said uranium consisting essentially of $U^{238}$ and $U^{235}$, said oxide having an average particle size between about 1 and about 50 microns and being present in an amount between about 1 percent and about 10 percent, by weight of said mixture, within a supporting aluminum matrix in an amount of between about 10 percent and about 30 percent, by weight of said mixture, encasing said mixture in an aluminum container, densifying said mixture within said container, including hot pressing and sintering said mixture in a hydrogen atmosphere at a pressure of up to about 25,000 pounds per square inch and at a temperature above about 500° C. but below the melting point of aluminum, and thereafter cooling said mixture and container, while maintaining said hydrogen atmosphere, to provide a solid fuel element having a density of at least about 80 percent of the theoretical density and high structural strength and inherent safety, wherein said uranium oxide and said zirconium hydride are maintained in particle form, and said container and said particulate zirconium hydride are bonded to said matrix, and maintaining hydrogen at about atmospheric pressure within said container while sealing said container in a gas-tight manner.

10. The method of fabricating a fuel element for a neutronic reactor, which comprises the steps of homogeneously mixing together zirconium hydride having a hydrogen to zirconium ratio of between about 1.8:1 and about 2:1 and an average particle size between about 5 and about 1000 microns in an amount between about 60 percent and about 90 percent, by weight of the mixture, oxide of uranium, said uranium consisting essentially of $U^{238}$ and $U^{235}$, said oxide having an average particle size between about 1 and about 50 microns and being present in an amount between about 1 percent and about 10 percent, by weight of said mixture, and aluminum matrix material having an average particle size between about 10 and about 200 microns in an amount between about 10 percent and about 30 percent, by weight of said mixture, encasing said mixture in an aluminum container, densifying said mixture within said container by cold pressing said mixture at a pressure between about 10,000 and about 40,000 pounds per square inch at ambient temperature to a density of at least about 65 percent of theoretical density and thereafter hot pressing and sintering said mixture at a pressure of between about 1000 and 25,000 pounds per square inch at a temperature between about 500° C. and the melting point of aluminum in the presence of a hydrogen atmosphere to a density of at least about 80 percent of theoretical density to provide a solid fuel element having high structural strength and inherent safety, wherein said uranium oxide and said zirconium hydride are dispersed in particle form within an aluminum matrix, and said container and said particulate zirconium hydride are bonded to said matrix, cooling said fuel element to ambient temperature while maintaining said hydrogen atmosphere and sealing said container in a gas-tight manner while maintaining said hydrogen in said container at about atmospheric pressure.

11. The method of fabricating a fuel element for a neutronic reactor, which comprises the steps of homogeneously mixing together zirconium hydride having a hydrogen-to-zirconium ratio of about 1.85:1 and an average particle size between about 5 and about 1000 microns in an amount between about 60 percent and about 90 percent, by weight of the mixture, oxide of uranium, said uranium consisting essentially of $U^{238}$ and $U^{235}$, said oxide having an average particle size between about 1 and about 50 microns and being present in an amount between about 1 percent and about 10 percent, by weight of said mixture, and aluminum matrix material having an average particle size between about 10 and about 200 microns in an amount between about 10 percent and about 30 percent, by weight of said mixture, encasing a charge of said mixture in an elongated aluminum container, densifying said charge within said container by cold pressing at a pressure of between about 10,000 and about 40,000 pounds per square inch at ambient temperature to a density of about 65 percent of theoretical density and thereafter hot pressing and sintering said charge at a pressure of between about 10,000 and about 25,000 pounds per square inch at a temperature between about 500° C. and about 600° C. in a hydrogen atmosphere to a density of at least about 80 percent of theoretical density, preferably about 95 percent of theoretical density, introducing additional charges of said mixture within said container and repeating said cold pressing and hot pressing and sintering in the aforedescribed manner for each of said additional charges when added to said container until said container is substantially completely filled with densified mixture, to provide a solid fuel element having high structural strength and inherent safety, wherein said uranium oxide and said zirconium hydride are dispersed in particle form within an aluminum matrix, and said container and said particulate zirconium hydride are bonded to said matrix, cooling said container while maintaining said hydrogen atmosphere and sealing said container in a gas-tight manner while maintaining said hydrogen in said container at about atmospheric pressure.

References Cited in the file of this patent

UNITED STATES PATENTS

| | | |
|---|---|---|
| 2,805,473 | Handwerk et al. | Sept. 10, 1957 |
| 2,814,857 | Duckworth | Dec. 3, 1957 |
| 2,816,042 | Hamilton | Dec. 10, 1957 |
| 2,843,539 | Bornstein | July 15, 1958 |

FOREIGN PATENTS

| | | |
|---|---|---|
| 614,156 | Great Britain | Dec. 10, 1948 |
| 648,293 | Great Britain | Jan. 3, 1951 |

OTHER REFERENCES

International Conference on Peaceful Uses of Atomic Energy, vol. 9, 1955, pp. 196–202.

Nucleonics, November 1956, vol. 14, No. 11, pp. 146–153.